(12) United States Patent
Yuasa

(10) Patent No.: US 10,311,475 B2
(45) Date of Patent: Jun. 4, 2019

(54) DIGITAL INFORMATION GATHERING AND ANALYZING METHOD AND APPARATUS

(71) Applicant: Go Yuasa, Rancho Palos Verdes, CA (US)

(72) Inventor: Go Yuasa, Rancho Palos Verdes, CA (US)

(73) Assignee: Go Yuasa, Rancho Palos Verdes, CA (US)

( * ) Notice: Subject to any disclaimer, the term of this patent is extended or adjusted under 35 U.S.C. 154(b) by 0 days.

(21) Appl. No.: 16/010,277

(22) Filed: Jun. 15, 2018

(65) Prior Publication Data

US 2018/0293612 A1 Oct. 11, 2018

Related U.S. Application Data

(63) Continuation-in-part of application No. 14/310,691, filed on Jun. 20, 2014, now abandoned.

(51) Int. Cl.

| *G06Q 30/02* | (2012.01) |
|---|---|
| *G06Q 50/12* | (2012.01) |
| *G06K 9/00* | (2006.01) |
| *G06Q 20/20* | (2012.01) |
| *G06Q 30/06* | (2012.01) |

(52) U.S. Cl.
CPC ..... *G06Q 30/0252* (2013.01); *G06K 9/00288* (2013.01); *G06Q 20/206* (2013.01); *G06Q 30/0631* (2013.01); *G06Q 50/12* (2013.01)

(58) Field of Classification Search
None
See application file for complete search history.

(56) References Cited

U.S. PATENT DOCUMENTS

| 6,873,710 B1* | 3/2005 | Cohen-Solal | G11B 27/10 382/100 |
|---|---|---|---|
| 8,010,402 B1* | 8/2011 | Sharma | G06Q 10/00 705/14.49 |
| 8,219,438 B1* | 7/2012 | Moon | G06Q 30/0201 705/7.29 |

(Continued)

OTHER PUBLICATIONS

Lee et al., An Intelligent Image-based Customer Analysis Service, Asia-Pacific Network Operation and Management Symposium (APNOMS) 2014.*

*Primary Examiner* — Mehmet Yesildag
(74) *Attorney, Agent, or Firm* — Baba Patent Agency

(57) ABSTRACT

An apparatus for forecasting preferred selections from a menu of a restaurant comprises a) a face recognition system including at least two cameras, b) a point of sales system (POS) including a portable terminal linked thereto and c) a server for running algorithms comprising steps of: receiving the demographic profiles of the customers; obtaining environmental information including weather information and event information from relevant websites via internet; obtaining the transaction data of the customers from the POS; correlating the inputted orders including types of dishes from the customers with demographic profiles of the customers and the environmental information to accumulate correlated data into database in the server; selecting the preferred selections from the database based on a criterial to narrow down a number of the preferred selections; and transferring the selected preferred selections to the portable terminal via the POS.

18 Claims, 15 Drawing Sheets

(56) References Cited

U.S. PATENT DOCUMENTS

| | | | |
|---|---|---|---|
| 8,706,544 B1* | 4/2014 | Sharma | G06Q 30/0202 |
| | | | 705/7.31 |
| 2013/0027561 A1* | 1/2013 | Lee | G06Q 30/02 |
| | | | 348/150 |
| 2013/0046634 A1 | 2/2013 | Grigg et al. | |
| 2013/0046637 A1* | 2/2013 | Slutsky | G06Q 30/0241 |
| | | | 705/14.66 |
| 2016/0196747 A1* | 7/2016 | Tsyrklevich | G08G 1/143 |
| | | | 701/532 |

* cited by examiner

FIG 13

| CONDITION 1 MALE<FEMALE | | TIME/PROBABILITY DISTRIBUTION | | | | |
|---|---|---|---|---|---|---|
| | | T1 | T2 | T3 | ... | Tn |
| ITEMS | FISH 1 | 65% | 60% | 62% | ... | 67% |
| | FISH 2 | 22% | 30% | 33% | ... | 28% |
| | FISH 3 | 13% | 10% | 5% | ... | 5% |

FIG 14

| CONDITION 2 FINE-> CLOUDY | | TIME/PROBABILITY DISTRIBUTION | | | | |
|---|---|---|---|---|---|---|
| | | T1 | T2 | T3 | ... | Tn |
| ITEMS | DESSERT 1 | 45% | 35% | 30% | ... | 10% |
| | DESSERT 2 | 35% | 40% | 50% | ... | 65% |
| | DESSERT 3 | 20% | 25% | 20% | ... | 25% |

FIG 15

| CONDITION 3 MALE 58% FEMALE 42% | | TIME/PROBABILITY DISTRIBUTION | | | | |
|---|---|---|---|---|---|---|
| | | T1 | T2 | T3 | | Tn |
| ITEMS | SOUP 1 | | | 65% | ••• | |
| | SOUP 2 | | | 25% | ••• | |
| | SOUP 3 | | | 10% | ••• | |

DIGITAL INFORMATION GATHERING AND ANALYZING METHOD AND APPARATUS

This application repeats a substantial portion of prior U.S. patent application Ser. No. 14/310,691 filed, Jun. 20, 2014 and adds disclosure not presented in the prior application. Because this application names the inventor or at least one joint inventor named in the prior application, it may constitute a continuation in part of the prior application, attention is directed to 35 U.S.C. 120, 37CFR 1.78 and MPEP § 211 et seq.

FIELD OF THE INVENTION

The present invention relates to a digital information gathering and analyzing method and apparatus, more particularly to a digital information gathering and analyzing method and apparatus for retail stores, such as restaurants and super markets.

BACKGROUND OF THE INVENTION

In marketing research and advertisement, personalization and specificity are two important key factors. In order to obtain useful market information, several technologies have been developed.

For example, US Patent Application Publication No.: US 2012/0287281 discloses a consumer interfaces and transaction systems for restaurants to create an individual profile for repeat customers to provide them with better services when they are recognized on the following visit. Also, the individual profile includes his/or her financial data.

U.S. Pat. No. 8,706,544 B1 discloses a method and system for forecasting the demographic characterization of customers to help customize programming contents on each means for playing output of each site of a plurality of sites in a media network through automatically measuring, characterizing and estimation the demographic information of customers that appear in the vicinity of each means for playing output.

However, when utilizing those gathered data as a tool for proactively sell products to the target customers in restaurants, other items giving more direct impact on actual sales are needed to be added, analyzed and formed to be a tool for promoting actual sales activities or for aiming at timely advertisements.

Even though, internet and computer networks have been rapidly spread in business environment and it becomes easy to get necessary information for the business, so far, there is no useful tool for automatically selecting necessary information and analyzing useful data efficiently for the specific business needs.

SUMMARY OF THE INVENTION

An object of the present invention is to overcome the drawbacks of current technologies described above and provide a digital information gathering and analyzing method and apparatus by utilizing technologies including task automation technologies, algorithmic data analysis and manipulation technologies, which include real time information gathering and situation updating technologies, environmental data via service APIs and personal and specific data collection technologies via face recognition. It becomes possible to efficiently obtain necessary market data with a timely manner by gathering a large amount of generalized data (age, gender, time etc.) to create a knowledge bank that is immediately applicable to any individual.

A first embodiment of the present invention is an apparatus for forecasting preferred selections from a menu of a restaurant, the apparatus including a) a face recognition system including at least two cameras, wherein a first camera of the two cameras is arranged to capture facial images of customers visiting the restaurant and a second camera of the two cameras is arranged to capture the facial image of the customers leaving the restaurant, wherein the face recognition system is capable of creating demographic profiles of the customers based on the captured facial images of customers, wherein the demographic profiles include estimated age, gender and ethnicity of the customers; b) sensor system for capturing temperature inside the restaurant and/or sound signals inside the restaurant; c) a point of sales system (POS) including a portable terminal linked thereto for inputting orders from the customers, and for displaying transaction data including the preferred selections from the menu, wherein inputted orders are transmitted to the POS from the portable terminal; and d) a server for running algorithms comprising steps of: receiving the demographic profiles of the customers from the face recognition system; obtaining environmental information including weather information and event information from relevant websites via internet; obtaining temperature to control room temperature and/or sound signals from the sensor to analyze atmosphere in the restaurant; obtaining the transaction data of the customers from the POS; correlating the inputted orders including types of dishes from the customers within a predetermined time period with demographic profiles of the customers staying at the restaurant within the predetermined time period and the environmental information including weather information and event information to accumulate correlated data into database in the server; selecting the preferred selections from the database based on a criterial to narrow down a number of the preferred selections; and transferring the selected preferred selections to the portable terminal via the POS.

According to the embodiment described above, each step of the algorithms running on the server can be automatically processed without involvement of employees. Those processes of each step have been performed by man power in a past. Thus, employees of the restaurant can spend more time for customer services, which can improve the sales efficiency of the restaurant activities.

Another embodiment of the present invention is an apparatus for forecasting preferred selections from a menu of a restaurant, the apparatus including a) a face recognition system including at least two cameras, wherein a first camera of the two cameras is arranged to capture facial images of customers visiting the restaurant and a second camera of the two cameras is arranged to capture the facial image of the customers leaving the restaurant, wherein the face recognition system is capable of creating demographic profiles of the customers based on the captured facial images of customers, wherein the demographic profiles include estimated age, gender and ethnicity of the customers; b) a point of sales system (POS) including a portable terminal linked thereto for inputting orders from the customers, and for displaying transaction data including the preferred selections from the menu, wherein inputted orders are transmitted to the POS from the portable terminal; and c) a server for running algorithms comprising steps of: receiving the demographic profiles of the customers from the face recognition system; obtaining environmental information including weather information and event information from relevant websites via internet; obtaining the transaction data of the customers from the POS; correlating the inputted orders including types of dishes from the customers within a predetermined time period with demographic profiles of the customers staying at the restaurant within the predetermined time period and the environmental information including weather information and event information to accumulate correlated data into database in the server; selecting the preferred selections from the database based on a criterial to narrow down a number of the preferred selections; and transmitting the selected preferred selections onto SNS (Social Network Service).

According to the embodiment described above, advertisements of preferred selections from menu can be automatically selected and transmitted onto SNS. These advertisements are automatically processed by the server so that the effective and timely advertisement can be achieved using SNS without involvement of clerks of the restaurant.

Another embodiment of the present invention is an apparatus for forecasting preferred selections from a menu of a restaurant, the apparatus including a) a face recognition system including at least two cameras, wherein a first camera of the two cameras is arranged to capture facial images of customers visiting the restaurant and a second camera of the two cameras is arranged to capture the facial image of the customers leaving the restaurant, wherein the face recognition system is capable of creating demographic profiles of the customers based on the captured facial images of customers, wherein the demographic profiles include estimated age, gender and ethnicity of the customers; b) a point of sales system (POS) including a portable terminal linked thereto for inputting orders from the customers, and for displaying transaction data including the preferred selections from the menu, wherein inputted orders are transmitted to the POS from the portable terminal; and c) a server for running algorithms comprising steps of: receiving the demographic profiles of the customers from the face recognition system; obtaining environmental information including weather information and event information from relevant websites via internet; obtaining the transaction data of the customers from the POS; correlating the inputted orders including types of dishes from the customers within a predetermined time period with demographic profiles of the customers staying at the restaurant within the predetermined time period and the environmental information including weather information and event information to accumulate correlated data into database in the server; selecting the preferred selections from the database based on a criterial to narrow down a number of the preferred selections; and displaying the selected preferred selections onto a digital signage installed in the restaurant or outside the restaurant.

According to the embodiment described above, advertisements of preferred selections from the menu can be automatically performed via digital signages installed in the restaurant or outside of the restaurant without involvement of employees. Since the advertisement of the product can be automatically performed aiming at a specific target customer, the accuracy and effectiveness of the advertisement can be improved, and more sales amounts can be expected in a timely manner.

BRIEF DESCRIPTION OF THE DRAWING

FIG. 13 illustrates probability distribution of dishes selected by the customers of a restaurant for each time windows from T1 to Tn under the condition where the number of female customers is larger than that of male customers.

FIG. 14 illustrates probability distribution of desserts selected by the customers of a restaurant for each time windows from T1 to Tn under the condition where weather is changing from fine to cloudy.

FIG. 13 illustrates probability distribution of dishes selected by the customers of a restaurant for each time windows from T1 to Tn under the condition where the number of female customers is larger than that of male customers.

FIG. 15 illustrates probability distribution of soups selected by the customers of a restaurant for each time windows from T1 to Tn under the condition where the 58% of customer is male and 42% customer is female.

DETAILED DESCRIPTION OF THE INVENTION

Figure 1:
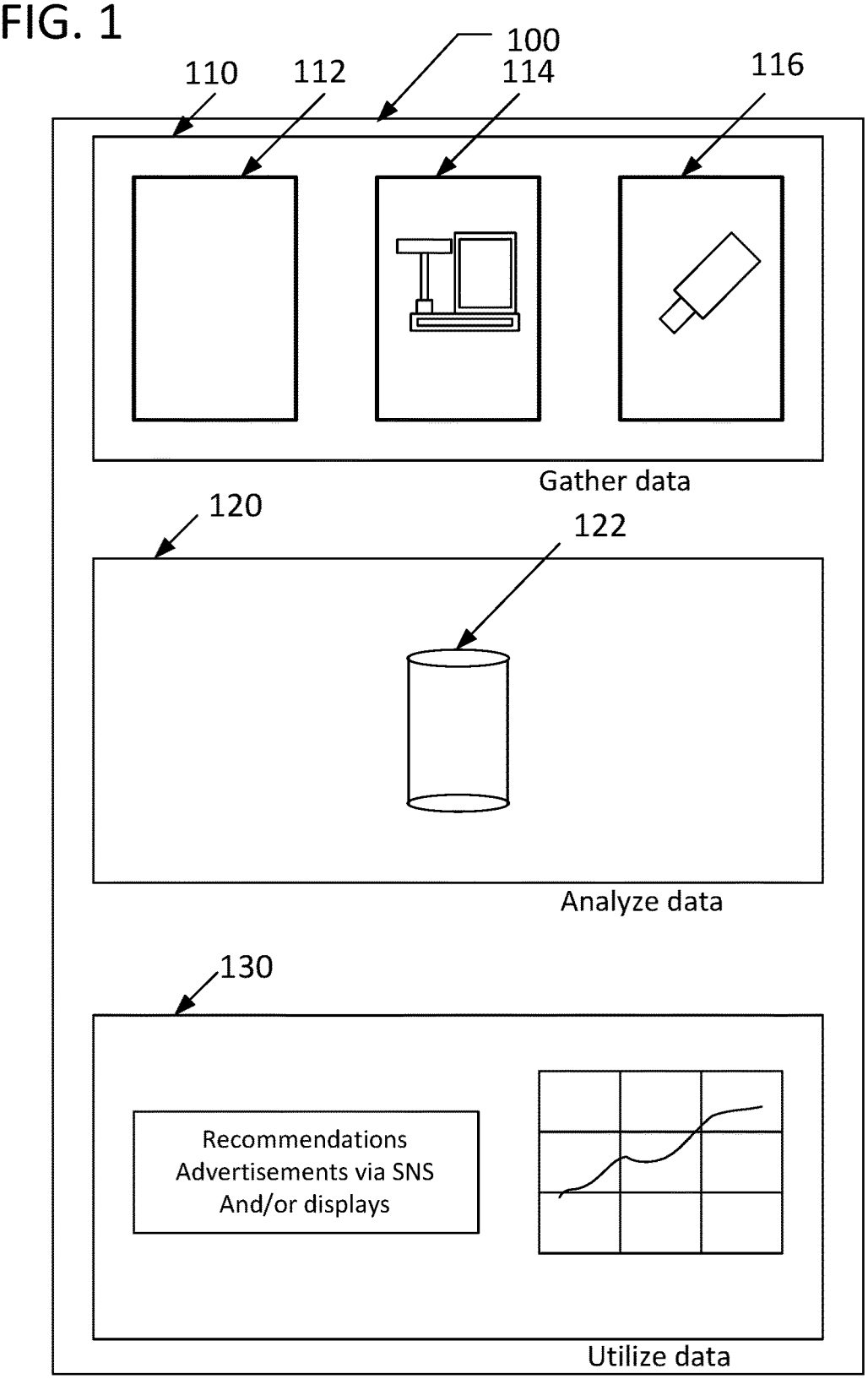
FIG. 1 illustrates a system configuration of a digital information gathering and analyzing apparatus.

Referring to the drawings, the following describes the details of an embodiment of the present invention pertaining to a digital information gathering and analyzing method and apparatus to be used in retail store industries, such as restaurants and retail stores to improve profit and sales amounts of the stores.

FIG. 1 illustrates a system configuration of the digital information gathering and analyzing apparatus 100. The digital information gathering and analyzing apparatus 100 is configured by three subsystems including a data gathering subsystem 110, a data analyzing subsystem 120 and an application subsystem 130. The data gathering subsystem 110 is designed to obtain environmental information via Internet 112, transaction data from POS (Point of Sales) system 114 and image data of customers captured by a camera 116. The environmental information includes, for example, weather data, event information including sports, conference and seminars, and economic information including stock prices and indexes, which are provided by third party websites via internet 112. The POS (Post of Sales) system 114 provides transaction data of customers obtained from POS terminals linked to the digital information gathering and analyzing apparatus 100. The camera 116 is arranged to capture image data of customers visiting the store. The camera 116 may be a still camera or a video camera.

The data analyzing subsystem 120 includes a CPU (Central Processing Unit, not shown) 122 on which algorithms for executing instructions for obtaining the data from websites via internet 112, POS system 114 and camera 116 and analyzing the data run. The data analyzing subsystem 120 also includes memories (not shown) for storing the algorithms and communication interface (not shown) for communicating with the websites via Internet 112, the POS systems 114 for imputing transaction data and the camera 116 for capturing facial images of customers.

The application subsystem 130 has functions for executing algorithms for utilizing the analyzed data obtained in the analyzing subsystem 120 to create recommendations to the customers and timely advertisements to the specific customers. The algorithms related to the application subsystem 130 are designed to be executed on the CPU 122 in the data analyzing subsystem 120 of the information gathering and analyzing apparatus 100.

Figure 2:
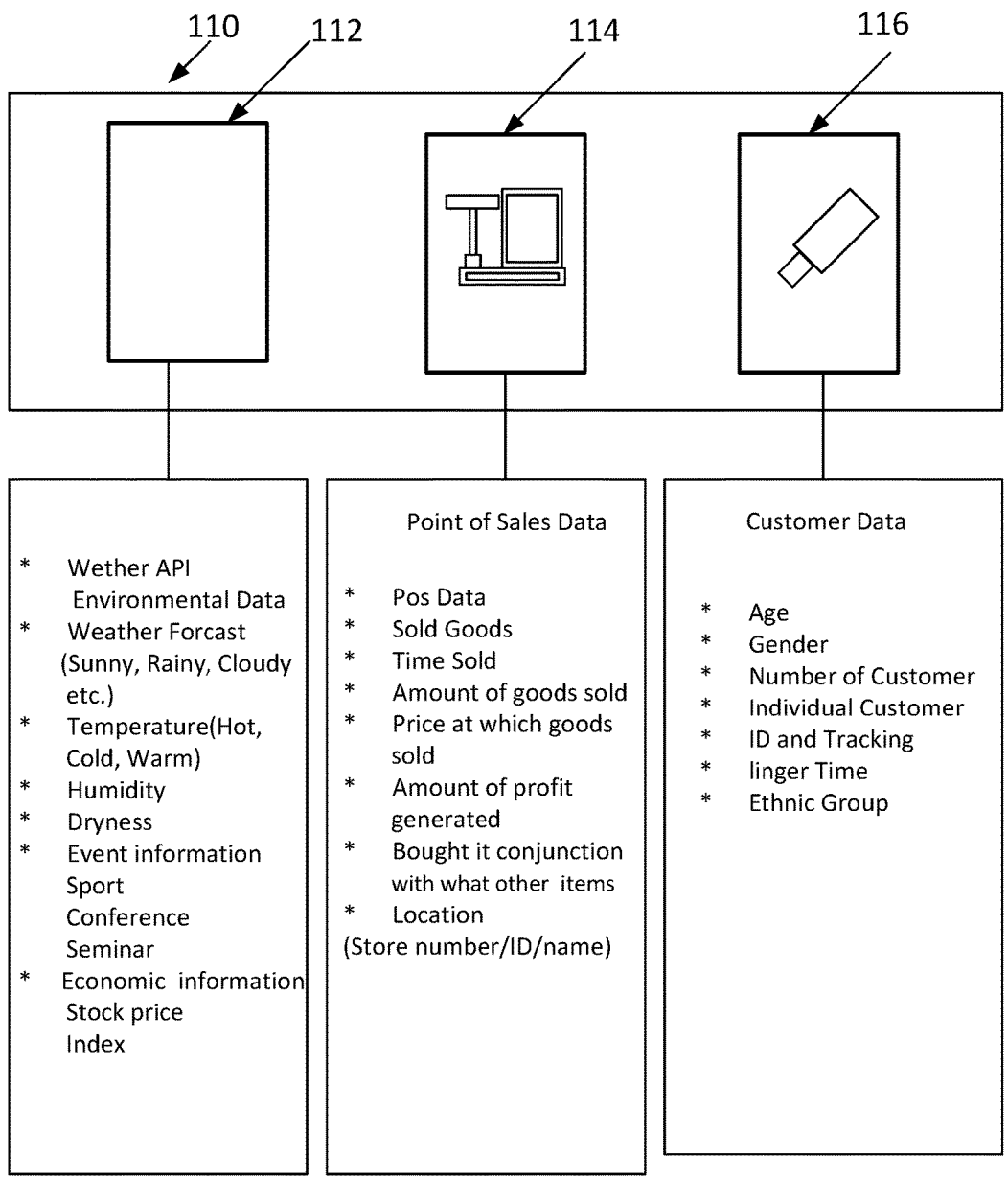
FIG. 2 illustrates three types of data sources used in the digital information gathering and analyzing apparatus illustrated in FIG. 1.

FIG. 2 shows the contents obtained from third party websites via internet 112 in this embodiment. The environmental information includes weather data, which will be provide by, third parties. The third part website provides a web service offering API (Application Programming Interface) which allows users to utilize the service via Internet offered in variety of different ways. There is provided current weather and weather forecast (sunny, rainy and cloudy etc.), temperature and humidity in the website. The environmental information further includes event information, such as baseball games, football games or music festivals held vicinity of the restaurant and traffic information provided by the third-party websites where a lot of potential customers can be expected. In the case of big sports event, the results of the games may affect the number of customers coming into the sports bars and restaurants. Accordingly, the location of the events is not limited to the vicinity of the restaurant. For example, game results of a team related to Los Angeles held in New York affects to the customer numbers expected to visit restaurants and sports bars in Los Angeles. Environmental information also may include economic information including stock prices.

The POS (Point of Sales) system 114 provides transaction data of each customer and a customer group visiting the restaurant. The transaction data includes types of sold goods, time sold, amount of goods sold, price at which the goods were sold, amount of profit generated, a table number where the customer(s) is located, number of customers including the customer group and goods bought in conjunction with other items, for example. These data obtained from POS terminals linked to the POS system 114 are very critical and important in the business because these data are formed into customer database for future use after correlated with other information, for example, environmental information and features extracted from the image data including face recognition information of customers, which will be described later. In an embodiment of the present invention, these data are also utilized to analyze customer trends and behaviors that will in turn be used to increase customer satisfaction and sales figures.

The camera 116 is arranged to capture facial images of customers visiting the store. The facial images include facial features of the customers from which gender, age and facial expression of customers can be extracted and calculated by the face recognition algorithms running on the CPU 122. Also, ethical groups into which customers belong are estimated by using the facial features extracted from the facial image obtained by the camera 116. Individual customer ID, tracking information related to the individual in the store, linger time at the store and degree of satisfaction using the facial expression are obtained and calculated utilizing face recognition technologies. It should be noted that an object of identification of customers in the embodiment of the invention is not to obtain personal information using face recognition, but it is used for classifying customers into features such as age, age groups, and gender which will be used as variables when calculating probability distributions to make recommendations or advertisements for aiming at specific customers.

Face recognition algorithm arranged to be executed on the CPU 122, together with the images captured by the camera 116 is designed to automatically estimate age, gender, a satisfaction degree using facial expression of each customer and the number of people in the customer group. The face recognition algorithm is also capable of singling out target individuals like employees and VIPs from captured images. A plurality of cameras may be installed in the store to capture the facial images of customers at a plurality of places in the store. At least a camera 116 is installed at the entrance facing toward the entrance of the store, and at least a camera 116 is installed facing toward the inside of the store so that the facial images of the customers visiting to the store and leaving the store can be obtained. However, there is a case when the camera cannot obtain a facial image of a target customer because the target customer faces different direction from the camera. Accordingly, it is recommended to install a plurality of cameras in a plurality of places in the restaurant to shoot the customer faces to obtain the facial of the customer. Each image obtained by the camera has a time stamp on each image taken by the camera. Then it is possible to calculate the lingering time of the customer by using the time stamp on the first facial image and the time stamp of the last facial image of the same. Inventor believes that it is possible to obtain the lingering time of the customers, which may be a slightly different from the true lingering time but may be considered as lingering time of the customer.

When capturing the facial images of customers at each location where the camera 116 is installed, a time stamp is put on the image data as described above so that the lingering time can be obtained by calculating the difference between the entrance time and the leaving time of the customer by identify the same facial image data, or close enough to each other of the customers obtained by these cameras 116. Further, emotional response of the customer(s), such as, delighted expression, depressed expression, etc. can be obtained, analyzed and stored in customer database in the memory. These data can be used to obtain the satisfaction degrees of customers.

Satisfaction degrees of the customer(s) can be estimated by analyzing the captured facial images using the face recognition algorithm running on the CPU 122. Since face recognition algorithm works with still images or with each frame of video signals of a video camera, the cameras installed in the store may be still cameras or video cameras. Further an ethnic group of the customer is identified by analyzing the feature extracted from the facial images taken by the camera.

The individual ID assigned to each customer used in this embodiment is an anonymous name, which is given to each person or each group of the image data obtained by the camera 116 using the face recognition algorithm running on the CPU 122. The age group, gender or facial expression are automatically read from the image data using the face recognition algorithm running on the CPU 122. Then these data are stored together with the individual ID in the memory (not shown) of the data analyzing subsystem 120 together with time data when the image is taken from the camera 116.

The environmental information provided by the third-party website, the transaction data provided from the POS system 114 and image data of the customer or the customer group provided by the camera 116 are transmitted to the data analyzing subsystem 120. Then algorithm arranged running on the CPU 122 analyzes these data to obtain numerical correlation factors between the environmental information, the transaction data and the image data of the customer or customer group.

In other words, the algorithm running on the CPU 122 calculates a probability distribution of an event, for example, a selection from a menu in the restaurant under certain conditions including customer profile (an age, and age group and gender, for example), the environmental information and transaction data stored in the database in the memory (not shown) in the data analyzing subsystem 120. The probability distribution predicts likelihood that the customer belonging to a certain customer profile selects a preferred selection from the menu associated with the environmental information and historical transaction data of the customer.

In order to correlate the face recognition data obtained by the camera 116 with the transaction data provided by the POS system 114, the camera 116 may be installed to near the table having a table number to capture the customer sitting in the table of the restaurant, for example. The table number is given to each table of the restaurant so that the table number can be recorded on a merchandized document when an employee takes order from the customer(s), which is used in the transaction of the POS system, for example. Then the face recognition data to which ID (an identification number) is given can be correlated with the POS data via the table number of the table where the customer(s) has been located.

Further, lingering time of the customer can be obtained associated with the customer by checking the time stamps on the facial images taken when the customer enters the restaurant and leaves the restaurant. Also, it is possible to calculate the lingering time of the customer by using the time stamp on the first facial image and the time stamp of the last facial image of the same customer as described above.

In another embodiment, the camera 116 is installed in the POS system so that the POS data and the face recognition data to which ID is given can be correlated with transaction data provided by the POS system 114. Since the environmental information is obtained by being triggered by the facial images took by the camera 116 when the customer enters the restaurant, the environmental information, the face recognition data being used to form profile of the customer(s) to which ID is given, and the transaction data can be automatically correlated with each other.

Figure 3:
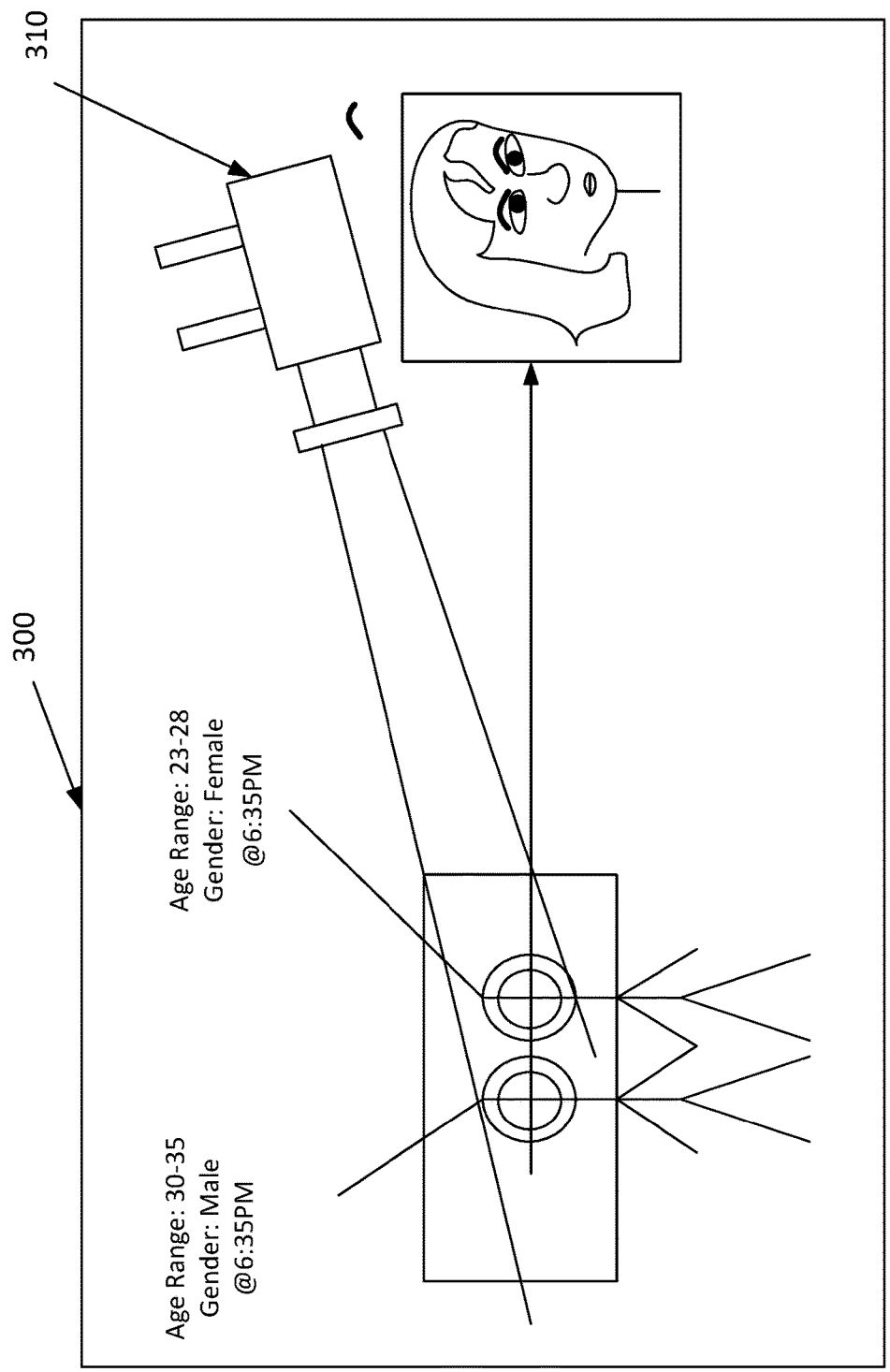
FIG. 3 illustrates a face recognition system used in the digital information gathering and analyzing apparatus.

FIG. 3 illustrates a face recognition system 300 used in the digital information gathering and analyzing apparatus 100. In this example, a camera 310 captures an image including two people. The face recognition algorithm for analyzing features of captured facial image of each person is arranged to run on the CPU 112 in the data analyzing subsystem 120 (referring to FIG. 1) to estimate the age or the age group, the gender and the satisfaction degree using facial expression of the captured images by the camera 310 together with the time stamp on the facial image when the image is taken, In this example, the camera 310 is taking two people, but not limited to two people, one or a plurality people more than two will be acceptable.

According to this embodiment, the output of the face recognition system 300 shows the data including two people, one belonging to age group 30-35, gender: Male, and another belonging to age group: 23-28, Gender: Female, the image being captured at time of 6:35 PM by utilizing specific data associated with each component in the face of customers.

Figure 4:
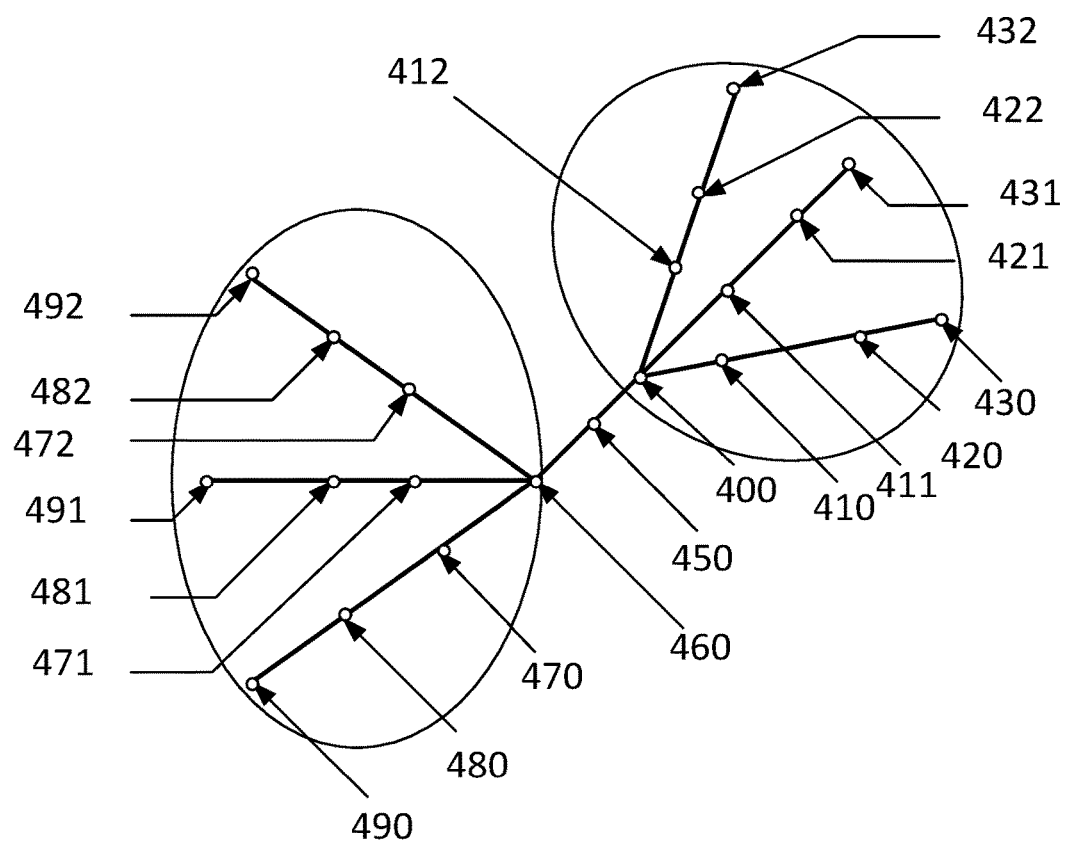
FIG. 4 illustrates a basic concept of relationship between data elements pertaining to customers or customer groups, which are modified and updated with new transactions associated with the customers or the customer groups.

FIG. 4 illustrates a basic concept of the data elements of a customer or a customer group of the present invention. The digital information gathering and analyzing apparatus 100 is arranged to perform self-learning algorithms for accumulating newly developed data, for analyzing and modifying the accumulated data for future use. The digital information gathering and analyzing apparatus 100 of an embodiment of the present invention requires deep and careful analysis of a wide range of data, as opposed to simply matching gathered individualized data, which leads to fundamentally different development procedures comparing with current technologies.

Large amounts of data need to be properly analyzed to be used to form specific market information required for a specific type of store needs. These algorithms take in large amounts of data to determine the relationship (correlations) between all the data. FIG. 4 shows two customer groups 400 and 460. Both customer groups 400 and 460 include three customers 410-412 and 470-472 respectively. Both groups enter the restaurant at the same time data 450. The camera 310 (referring to FIG. 3) captures facial image of all customers, 410-412 and 470-472. The data elements 420-422 and 480-482 represent age groups of each customer. The data elements 430-432 and 490-492 represent selected menu data, each customer has selected. When other transaction is performed, related data is added to the current data of the customer or customer group to update the data base. In this case two customer groups 400 and 460 are correlated with each other via time data 450. However, from these data, the correlation values between, for example, the menu selected and age group to which each customer belongs to can be calculated, which can be utilized as marketing information later. The correlation value is not limited to this. For example, correlation value between selected menu, time data, weather data, temperature data and humidity data may be calculated using the algorithm.

Statistically relevant information and connections produced by advanced algorithms are beyond what humans are able to visualize. The digital information gathering and analyzing apparatus 100 takes in and integrates new information to keep up to date with changing trends and new sources of information as described above.

Next, self-learning algorithms associated with the current invention will be described. The self-learning algorithm of database largely depends on what data is added to the database as "feedback" sources. Following is an example of a self-learning algorithm associated with the current invention. It is assumed that a customer or a group of customers stopped by at a restaurant utilizing the digital information gathering and analyzing apparatus 100 into which the self-learning algorithm is installed. The camera 116 installed at the entrance of the restaurant captures the facial image of the customer(s). Also, weather data 112 including time data, day of the week, temperature and humidity are obtained from a website linked to the digital information gathering and analyzing apparatus 100 via computer network or internet. Then, the digital information gathering and analyzing apparatus 100 compares the current customer profile containing current environmental information including weather information with the historical data which has been stored in the customer database in the digital information gathering and analyzing apparatus 100, which also includes transaction data associated with the customer profiles.

When the current data matches or closes to the ones of the historical data, the digital information gathering and analyzing apparatus 100 pickups the menus, which were sold well to the customers(s) who is categorized into the same profile group, a same age group or a same gender or any combination thereof in a past. Then, the sales person recommends or advertises the menu selected by the digital information gathering and analyzing apparatus to the customers.

The results of the sales are inputted to the digital information gathering and analyzing apparatus 100 from the POS system 114 in a real time or later time as feedback information. Then, the digital information gathering and analyzing apparatus 100 is able to have more information which increases the stored data which refines the stored customer profile whether or not new menu or the same menu is selected form the customer(s). This self-leaning algorithm is installed in the algorithms used in an embodiment of the present invention.

Followings are some examples of functions of an embodiment of the present invention.

Example 1

Following is an example of self-learning algorithm used when offering additional menu automatically selected by the digital information gathering and analyzing apparatus 100 under specific conditions described below:

Current time and day of the week: 17:00-17:30, Thursday
Gender distribution of customers currently staying in the restaurant: Men: 70%, Female: 30%
Current weather/Temperature/Humidity: Fine/70-75 F/35-40%

Historical data stored in the digital information gathering and analyzing apparatus 100 shows that French-flies is sold at the probability value of 73% and beer can be sold at the probability value of 61% under the current weather and customer data listed above.

Then, the digital information gathering and analyzing apparatus 100 notifies the waiter/waitress of the restaurant that "French-flies" and "beer" should be recommend to the customers or displays advertisement of "French-flies" and "beer" on display device held by the waiter/waitress of the restaurant or a digital signage (a display device) in the restaurant. When "French-flies" or "beer" is sold, the sales amount can be increased. If it is unsuccessful, this data is reflected on the data of POS and updated the historical data. In this example, the digital signage is installed in the restaurant. However, it may be arranged outside of the restaurant or outside and inside of the restaurant.

Figure 5:
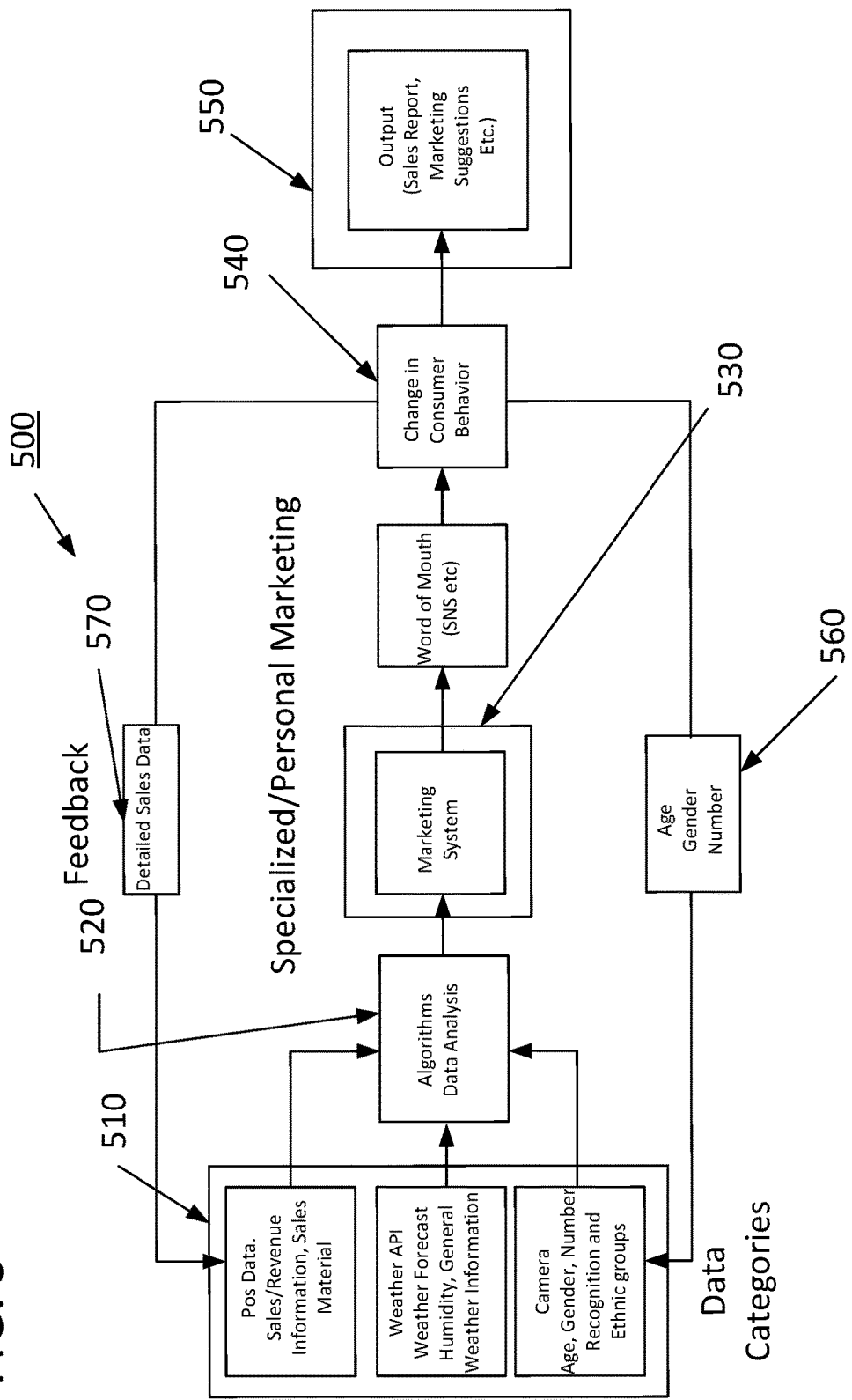
FIG. 5 illustrates a system configuration of a digital information gathering and analyzing apparatus of an embodiment of the present invention.

FIG. 5 illustrates a system configuration of a digital information gathering and analyzing apparatus 500 in an embodiment of the present invention. The data gathering subsystem 510 includes POS data obtained by a POS system, environmental information including weather data obtained by a third-party website and face-recognition data captured by a camera being transmitted to the data analyzing subsystem 520. The POS data, weather data and face-recognition data are utilized as basic data in the digital information gathering and analyzing apparatus 500. An algorithm/data analyzing subsystem 520 contains 1) an algorithm for obtaining environmental information from a website via computer network or internet, POS data and face-recognition data, and for controlling data from POS system together with the environmental information from the website and face recognition data from the camera to calculate the correlation factors of each event to obtain the probability distribution between events occurring associated with the customer including transaction data and environmental data, 2) face recognition algorithm for extracting features of the facial image data captured by the camera and for calculating estimated an age or an age group to which the customer falls to form customer profile.

Under the algorithm, there is calculated the probability of each menu to be sold under a specific condition, such as environmental conditions including weather of the day, temperature and humidity, the age group, gender of the customer, time of the day and the day of the week when the specific menu is sold. In other words, the correlation value of each menu is calculated associated with weather information and customer profile including gender, age group of the customer associated with the POS data.

The algorithm/data analyzing subsystem 520 determines whether or not the profiles of the current customer(s) match to or closes to the one in the historical data by comparing newly captured data with the historical data. Further, the historical data including the face recognition data, weather data and POS data are analyzed to calculate the probability of each possible menu to be sold under the current environmental conditions, such as, weather data, temperature, humidity, age group of the customer, time and day of the week and transaction data. Then, the recommended menus having the higher probability will be provided. Based on the determinations of the data analyzing subsystem 520, the marketing system 530 outputs the recommendations to the customer based on the historical data, which is presented to the customers directly, digital signage in the store or via a word of mouth (for example SNS (Social Network Service etc.) This task is automatically performed by the digital information gathering and analyzing apparatus 500 so that restaurant stuffs can spend their time to their customers.

The results of the sales (transaction data) or the advertisement of recommended menu are added to the historical data via feedback loop 560 or 570 to update the historical data via POS systems as shown in FIG. 5.

When a customer or a group of customers stops by at a restaurant, the digital information gathering and analyzing apparatus 500 compares the customer profile visiting the restaurant and current environmental information obtained by the digital information gathering and analyzing apparatus 500 with the stored data including customer profiles associated with transaction data provided by the POS system and environmental information at the algorithm data analyzing subsystem 520 illustrated in FIG. 5. Then, when the current data does not match or is not close to the ones of the stored data, the digital information gathering and analyzing apparatus 500 add those data including transaction data as new data to the database in the digital information gathering and analyzing apparatus 500.

The results of the sales or advertisements of the goods is input to the digital information gathering and analyzing apparatus 500 from the POS system in a real time or later time as feedback information through the feedback loop 560 or 570 as illustrated in FIG. 5.

Figure 6:
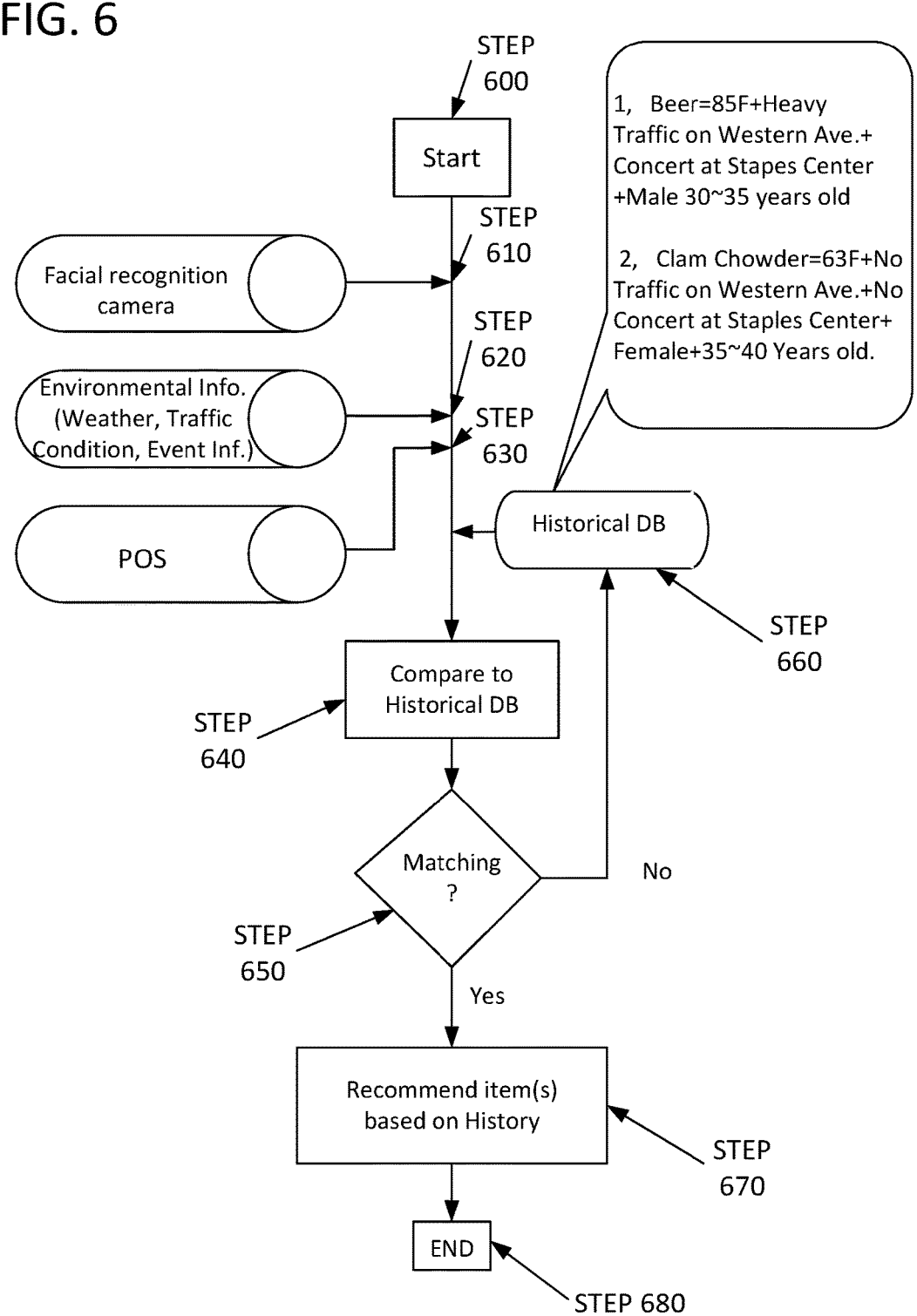
FIG. 6 illustrates a flow chart of a process of the digital information gathering and analyzing apparatus in FIG. 5 when a customer visits the restaurant having thereof.

FIG. 6 illustrates a flow chart of the process of the digital information gathering and analyzing apparatus 500 when customers visit the restaurant having thereof. When a customer visits the restaurant having the apparatus, the facial image data is taken by the camera installed at the entrance of the restaurant, (STEP 610). Then, the facial image data is analyzed to extract facial features of the customer to obtain estimated an age or an age group, gender and facial expressions of the customer. Environmental information includes weather information, traffic information associated with the location of the restaurant, for example, cross streets and related highway/freeway is obtained from related websites via internet, (STEP 620).

The analyzed face recognition data of the customer is compared with the historical customer data stored in the digital information gathering and analyzing apparatus 500. (STEP 640).

When the digital information gathering and analyzing apparatus 500 recognizes that the current customer profile is the same or close enough to customer profile in the historical data, the waiter or waitress obtains the information via a handy terminal thereof and recommends the menu sold to the customer or the customer having the similar type of profile in a past, (STEP 670). When the digital information gathering and analyzing apparatus 500 determines that the customer is new to the restaurant or that there is no customer having the similar type of profile, the historical transaction data having higher probability is automatically pickup based on the higher probability distribution of the combination of the gender, the age group, the weather condition, for example, to make recommendations to the customer.

When the digital information gathering and analyzing apparatus 500 does not find the same profile or the profile being close to the current customer, the new data including the facial face recognition data, the POS data and environmental information including current weather information together with other environmental information is added to the historical database in the digital information gathering and analyzing apparatus 500, (STEP 660).

Example 2

Figure 7:
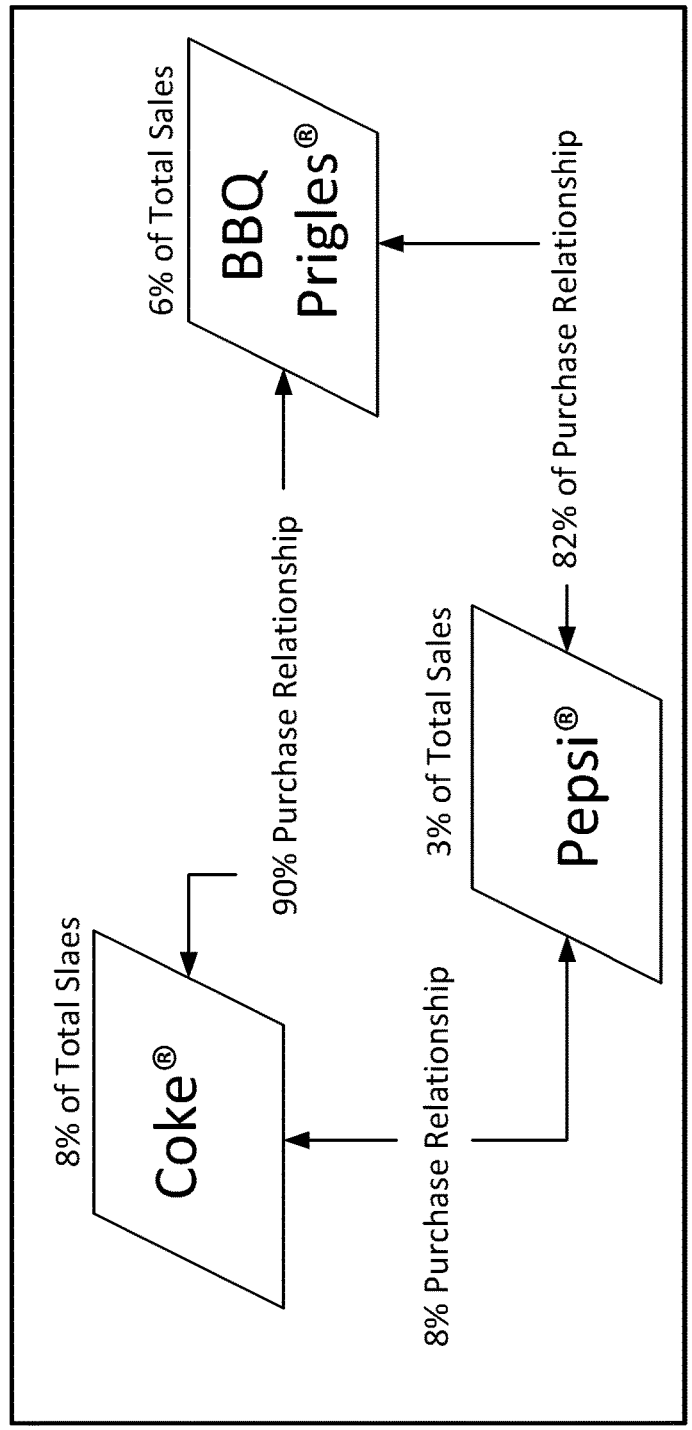
FIG. 7 illustrates an example of output of the digital information gathering and analyzing apparatus of an embodiment of the present invention which provides a correlation factor or a probability distribution between relevant products which are expected to be sold together at a specific time frame.

FIG. 7 illustrates anther embodiment of the present invention. According to an embodiment of the present invention, the digital information gathering and analyzing apparatus 500 is arranged to provide a potential relationship between relevant products. This example outlines a potential relationship between Coke®, Pepsi® and BBQ Pringles® at a market place under the weather condition: a sunny summer day, a time frame: 4:00 PM-5:00 PM, temperature: 80-90 Degrees and target age range being ages 21-24.

According to this example, on a sunny and hot day, Coke® sells fairly well, more than Pepsi®. BBQ Pringles® are often bought in conjunction with Coke® as well. Thus, advertisements that push Coke® and BBQ Pringles® towards young adults is planed during this time frame.

Figure 8:
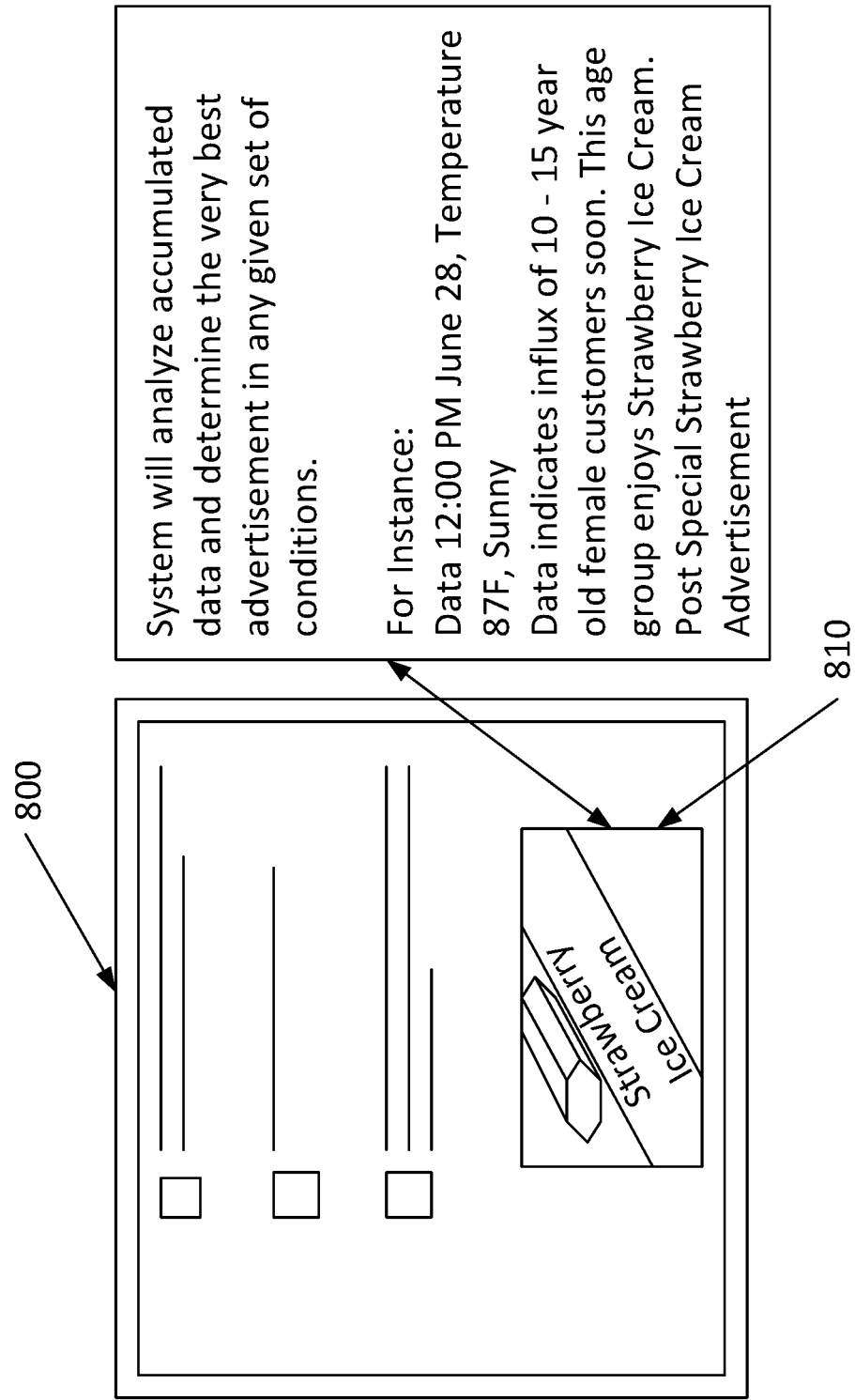
FIG. 8 illustrates an example of advertisement using a social network system which displays an advertisement of specific products aiming at potential customers belong to a specific age group and an age group.

FIG. 8 illustrates an example of output of the digital information gathering and analyzing apparatus 500 in an embodiment of the present invention using SNS (Social Network Service) associated the digital information gathering and analyzing apparatus.

Word-of-Mouth marketing (WOM marketing) being also called word of mouth advertising is an unpaid form of promotion in which satisfied customers tell other people how much they like a business, product, service, or event. SNS (Social Networking Service) is a web-based service that makes it easy to set up, operate, and send notifications from cloud.

SNS has created a brand new huge opportunity for utilizing the power of WOM marketing and advertising tactics. SNS allows WOM advertising to include entire social circles ranging from family, to co-workers, and even strangers.

An embodiment of the digital information gathering and analyzing apparatus of the present invention will be shown below.

Example 3

FIG. 8 illustrates an example of advertisement using SNS (social network system) which displays an advertisement of specific products aiming at potential customers belong to a specific age group.

Current time, date and weather condition: 12:00 PM June $28^{th}$, Temperature 87 F, Sunny.

The digital information gathering and analyzing apparatus 500 of the present invention indicates the influx of 10-15-year-old female customers soon. This age group enjoys Strawberry Ice Cream.

Then, the screen of SNS posts "Special Strawberry Ice Cream Advertisement" thereon or upload this advertisement on SNS as shown in FIG. 8. In this example, current weather condition is used as described above. In another example, contents of the menu may be changed according to the result of comparison between weather forecast and stored historical data in terms of menu of the restaurant. For, example, when rainfall is forecasted in several hours, the contents of menu of the restaurant can be changed according to the weather forecast based on the historical data.

Figure 9:
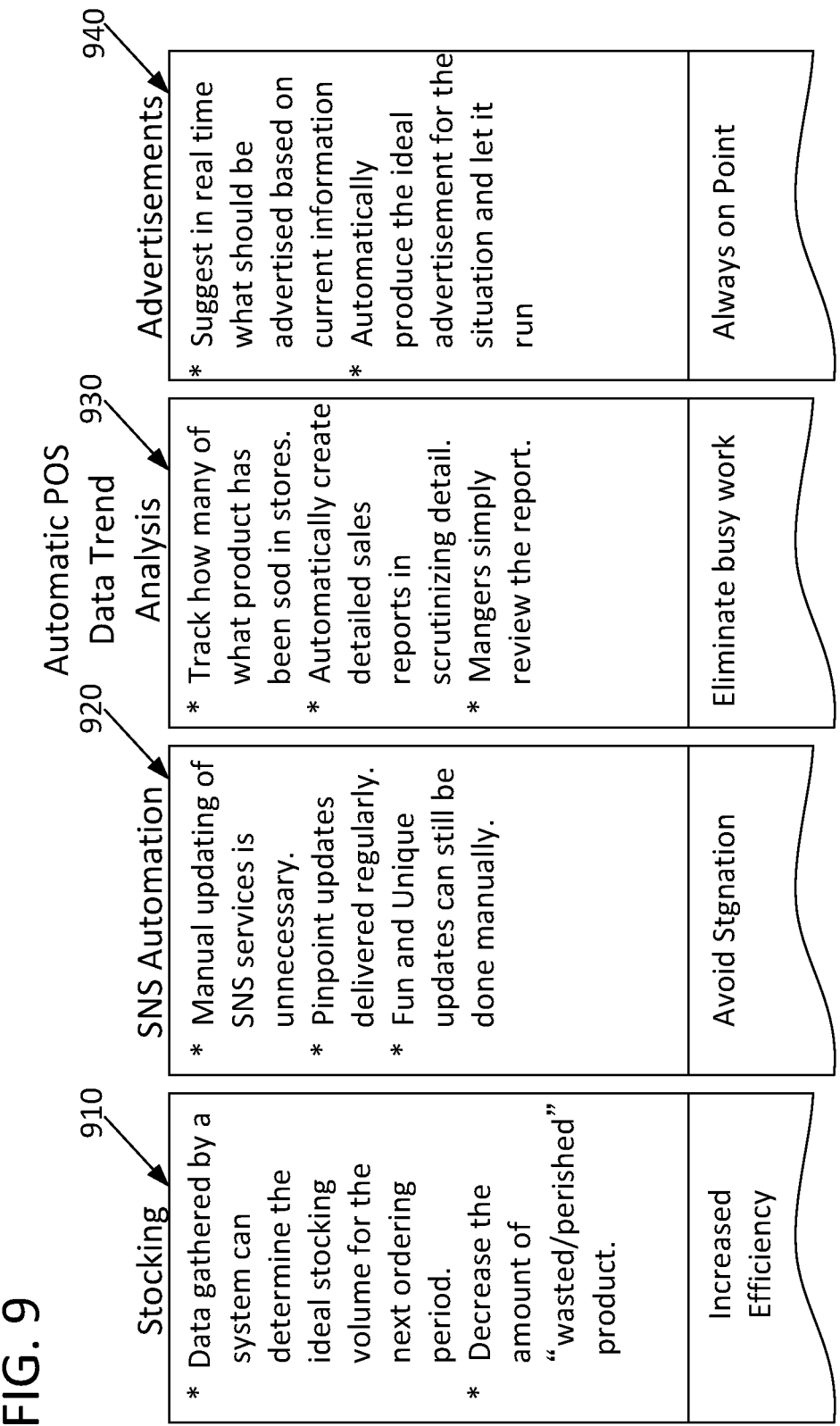
FIG. 9 illustrates features or advantages of an embodiment of the present invention being task automation of in gathering data, analyzing data and offering business recommendations and advertisements.

FIG. 9 illustrates a chart of advantages associated with an embodiment of the current invention. The advantages of an embodiment of the present invention includes 1) decreasing stocking volume 910, 2) SNS automation 920, 3) automatic POS data trend analysis 930 and 4) real time advertisements 940. The stocking material volume can be optimized by utilizing the combination of customer profile, weather forecast data and POS data in addition to the basic business planning factors so that the stocking volume can be optimized. SNS service can be performed aiming at a pin point target based on the updated business and environmental conditions automatically without putting special work of employees. By utilizing the POS data, environmental data and customer profile, the detailed sales report can be automatically created. Based on the current updated weather information and historical sales data, advertisements aiming at specific target can be automatically performed in a timely manner.

Example 4

Figure 10:
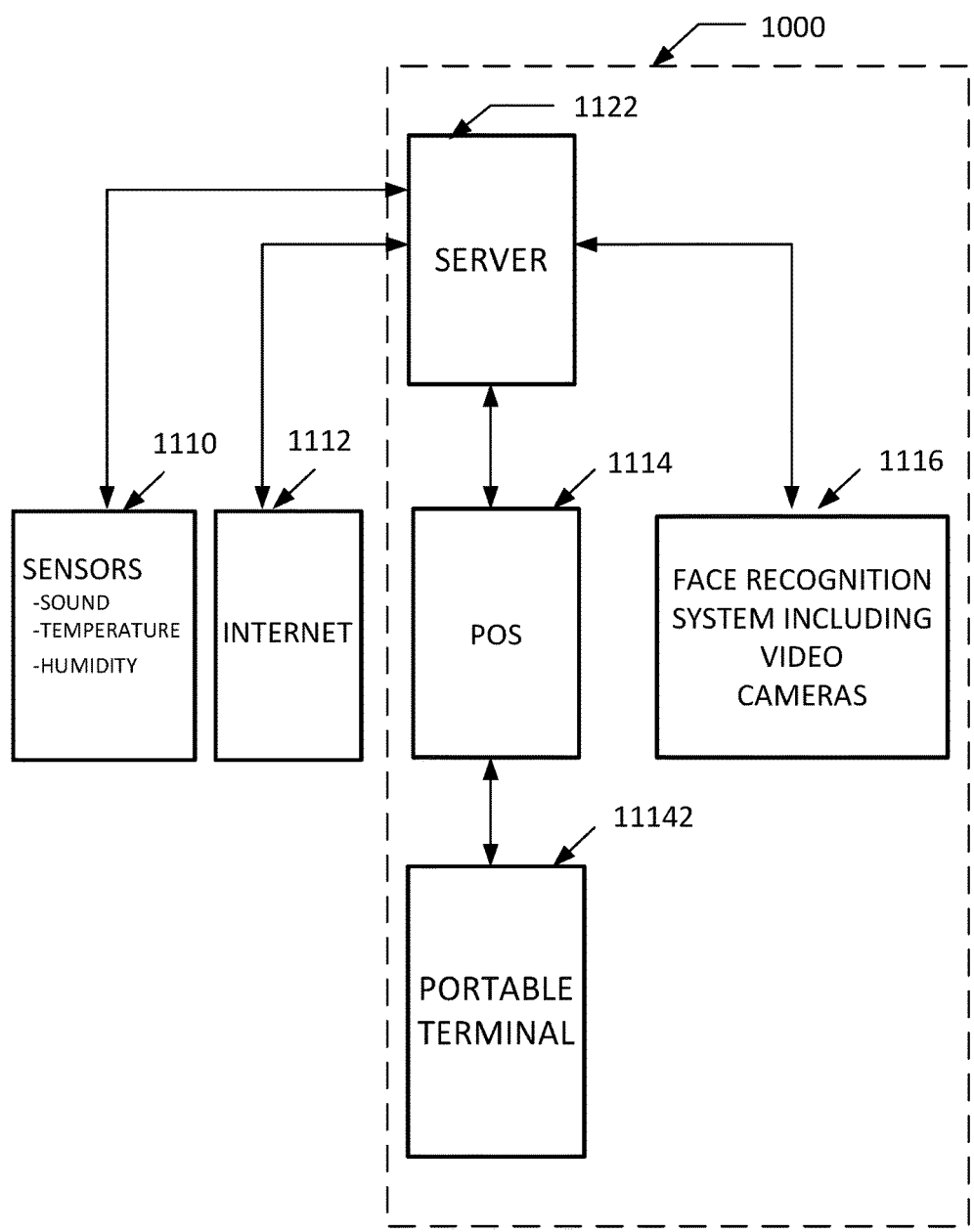
FIG. 10 illustrates a system configuration of the digital information and gathering and analyzing apparatus, which is another exemplary embodiment with a preferred embodiment of the present invention illustrated in FIG. 1.

FIG. 10 illustrates a system configuration of a digital information and gathering and analyzing apparatus 1000, which is another exemplary embodiment with a preferred embodiment of the present invention. In this embodiment, the system configuration is designed to realize a less expensive system configuration and lighter software load on the apparatus than that of the system configuration described previously in this specification illustrated in FIG. 1.

For example, a number of video cameras used in a face recognition system 1116 installed in the restaurant is two or three, which will be installed in the vicinity of the entrance of the restaurant. In the examples previously described in the original specification, a camera installed near each table is arranged to capture a table number assigned to each table in the restaurant. As described in paragraph [0029] in this specification, a table number captured by the camera is processed by the server and correlated with the order from the customer(s) (transaction data) assigned to the table taken by the waiter or waitress and the facial recognition data of the customer(s). In other words, the order of each customer is correlated with the face recognition data of the customer 1:1 in the embodiment pertaining to the system illustrated in FIG. 1.

In this system configuration of the digital information and gathering and analyzing apparatus 1000 illustrated in FIG. 10, the number of video cameras 1116 are two, which are installed in the vicinity of the entrance of the restaurant as explained using FIG. 11 which will be explained later. Further, in this exemplary embodiment of the present invention, a portable terminal 11142 for inputting the order from the customer with his or her estimated gender and an age range of the customer is linked to POS 1114. A waiter or waitress of the restaurant can input an estimated age range and gender, or the waiter may ask customer(s) to input the age range and gender if the customer agrees. The information related to gender and an age range of the customer are correlated to the order of the dishes from the customer (transaction data) and accumulated to historical database stored in server 1122. In the POS data, time and date information when the order is placed and the environmental information obtained through internet 1112 can also be correlated to the POS data in the server.

The environmental information obtained from internet 1112 includes weather information including weather of the vicinity of restaurant (it may be an area within about less than fifty miles from the restaurant). The weather information provides at least temperature and humidity information in addition to the weather pertaining to the vicinity of the restaurant. Further, the digital information and gathering and analyzing apparatus 1000 includes a sensor system 1110 for measuring temperature, humidity and sound signals (audible signals) in the restaurant and/or outside the restaurant. In this case the sound signals from the sensors 1110 are used to evaluate the atmosphere or satisfaction levels of the customers in the restaurant by analyzing and evaluating the sound signals inside the restaurant. Specific word signals captured by the sensor 1110 are analyzed to voice recognition functions included in Task Automation Algorithms (TAA) running on the server 1122 so that satisfaction level of customers can be checked. The sound levels of the customer can also be sued to know the satisfaction levels of the customer. Further, temperature sensor is provided to set room temperature inside the restaurant by controlling an air conditioner provided inside the restaurant.

Figure 11:
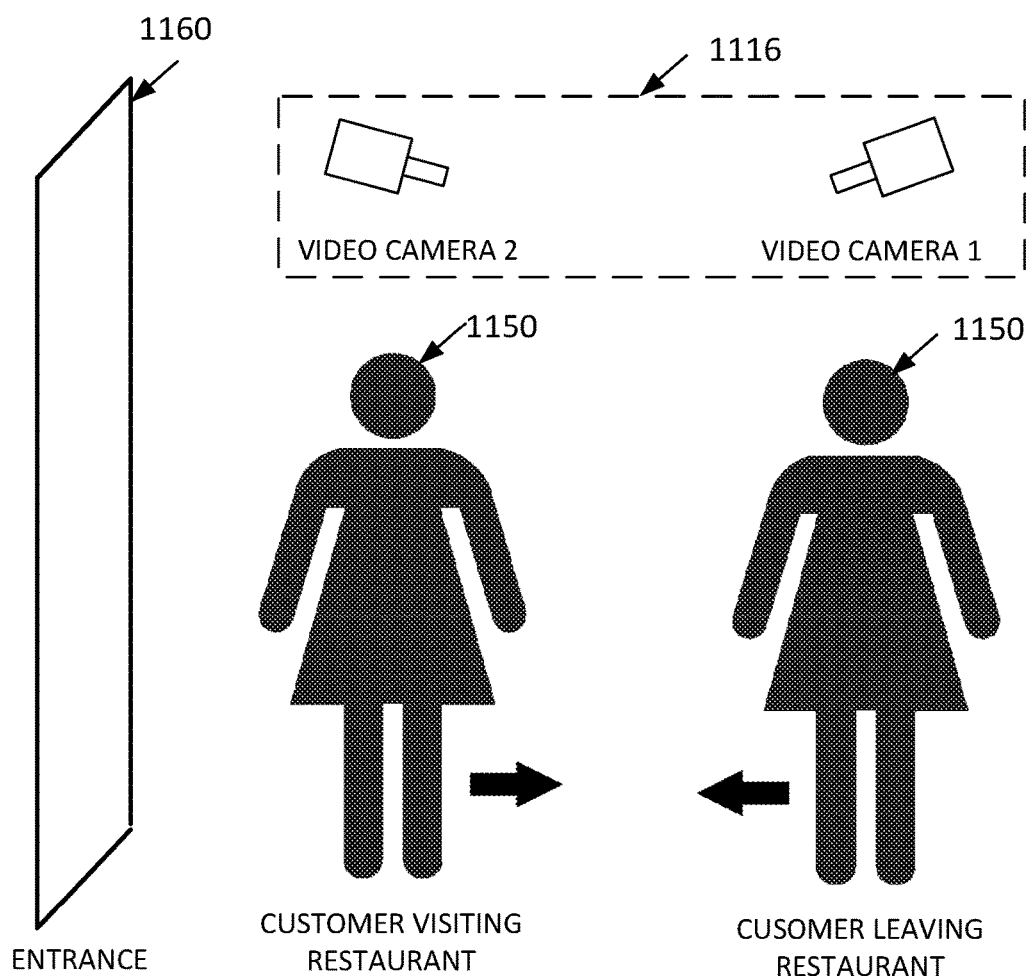
FIG. 11 illustrates an overall view of an exemplary embodiment of the invention executed in the vicinity of entrance of a restaurant where there are provided a video camera for capturing a facial image of a customer entering the entrance when the customer visits the restaurant and another video camera for capturing the facial image of the customer when the customer leaves the restaurant.

FIG. 11 illustrates an overall view of an exemplary embodiment of the invention which is executed near the entrance 1160 of a restaurant where video camera 1 is arranged to capture a facial image of a customer 1150 entering the entrance 1116 when the customer 1150 visits the restaurant and video camera 2 is arranged to capture the facial image of the customer 1150 when the customer leaves the restaurant. The facial image of the customer 1150 includes the facial features of the customer from which estimated age, gender (male and female), ethnic groups (Caucasian, African American, Hispanic and Asian) are estimated and classified in this embodiment by face recognition algorithms running of on video camera system 1116. The server 1122 may run the face recognition algorithms instead of video camera system 1116.

In this embodiment, when the customer 1150 enters the entrance 1160, the video camera 1 is arranged to automatically start capturing the facial image of the customer 1150 and a time stamp is recorded on a frame of the facial image. Further, a time stamp is recorded on a frame of the facial image captured by the video camera 2 when the customer leaves the restaurant so that a linger time of the customer 1150 in the restaurant can be obtained by subtracting the entering time recorded on the time stamp from the leaving time recorded on the time stamp on the video frame of the customer.

Figure 12:
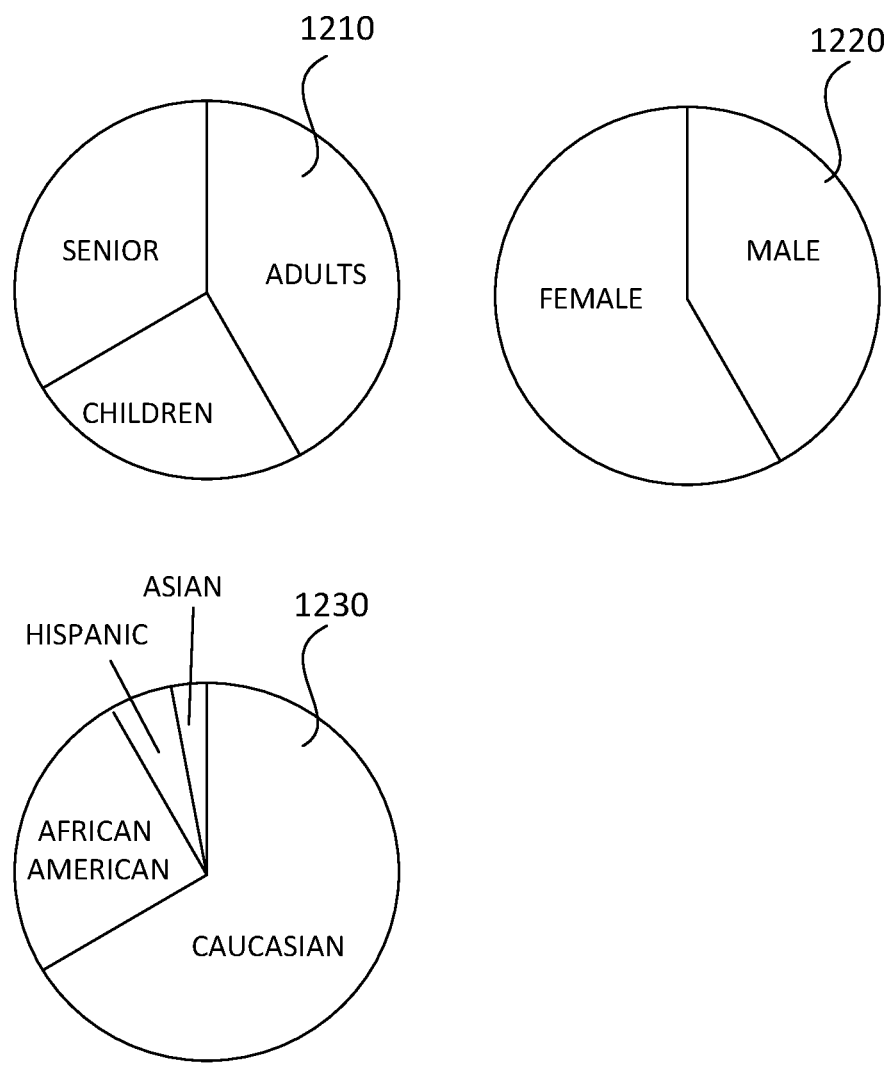
FIG. 12 illustrates exemplary pie charts of the exemplary demographic information measurement data including age groups, gender and ethics analyzed by the face recognition algorithm based on the extracted feature from the facial images of the customers staying at the restaurant for a predetermined time window captured by the video camera.

FIG. 12 illustrates exemplary pie charts of the exemplary demographic information measurements 1210 (age ranges), 1220 (gender) and 1230 (ethnicity) analyzed by a face recognition algorithm running on the video camera system 1116 or the server 1122 based on the extracted features from the facial images of the customers 1150 staying at the restaurant for a predetermined time window captured by the video camera 1116. Task automation algorithms (TAA) or algorithms running on the server 1122 are arranged to correlate each order from each customer from POS data, which is transaction data of the customers staying at the restaurant for a predetermined time window, with the analyzed demographic information measurements including gender and an age range, the environmental data including event information being held in the vicinity of the restaurant, weather information having temperature and humidity and calendar information having year, month and a day of the week. As described above, in this embodiment pertaining to the system illustrated in FIG. 10, orders placed customers in a predetermined time window are correlated to analyzed demographic information of customers and environmental information in the same predetermined time window as a bulk, but not 1:1 even though the estimated age and ethnicity information are inputted via portable terminal 11142.

FIG. 13 illustrates exemplary statistics of each dish in the menu in a predetermined condition, in this case the predetermined condition is the number of female customers is larger than that of male customers in a predetermined time window, which is analyzed by the TAA running on the server 1122. As illustrated in the exemplary statics, in the case that the number of female customers is larger than that of male customers, customers tend to select fish 1 than fish 2 or fish 3 in the menu for each time window from T1 to Tn. Based on this fact, it becomes possible to forecast the estimated quantity of each dishes based on the historical sales for a day of the week, a week of the month or a month of the year. However, at the same time, the forecasted sales for each dish changes according to the environmental information including weather information and event information.

FIG. 14 illustrates exemplary statistics of the dessert in the menu in a predetermined condition, in this case the predetermined condition is the weather, which is changing from fine weather to cloudy weather as time goes by. In this exemplary embodiment, as illustrated in the exemplary, weather changes from fine to cloudy, customers tend to select dessert 1 than dessert 2 or dessert 3 in the menu while weather is fine. However, the percentage of selecting dessert 2 gradually increases while weather is changing from fine to cloudy as time goes by from T1 to Tn. According to this fact, it becomes possible to forecast the estimated demand for each dessert based on the weather forecast. In this case it is also important to take account of the temperature and humidity forecast which will also change the total amount of these desserts.

Following is also an exemplary output of the Task automation algorithms (TAA) where weather seems to be rain in the afternoon according to weather information, TAA provides the information that customers with children decrease and as for the dessert, powdered green tea ice cream sells more than vanilla ice cream.

According to another exemplary statics of the selection of dessert in a time window (one hours from 5:00 PM to 6:00 PM, for example) and gender information shows that 58% of customers are male and 42% are female, weather: cloudy as illustrated in FIG. 15. Under this condition, TAA provides the information that historical information shows that clam chowder may be sold more than consommé soup. This information can be popped up on the display of the portable terminal 11142 linked to server 1122 via POS 1114. Then, waiters or waitress can recommend clam chowder to the customers based on this sales information.

Further, according to the same condition as described above, following information is automatically popped up on the display of the portable terminal 11142 linked to server 1122 via POS 1114 that "75%" of the customers who ordered beer may purchase "kimuchi". Then, waiters or waitresses can recommend customers "kimuchi" so that the sales amount can be increased.

According to another exemplary embodiment, in the case that an American football game is scheduled this weekend in the vicinity of the restaurant, and weather forecast is rain on the day of the week. There was a similar case two years ago. TAA suggests quantity of stocking of materials for the dishes expected to be sold well based on the historical transaction data from POS data in the sales history at that time. Further, the room temperature is controlled based on the measured room temperature captured by the sensor system 1110 based on the number of customers in the restaurant and/or analyzed data of the sound signals in the restaurant. This type of temperature control in the restaurant is quite new embodiment and works well.

Example 5

Figure 16:
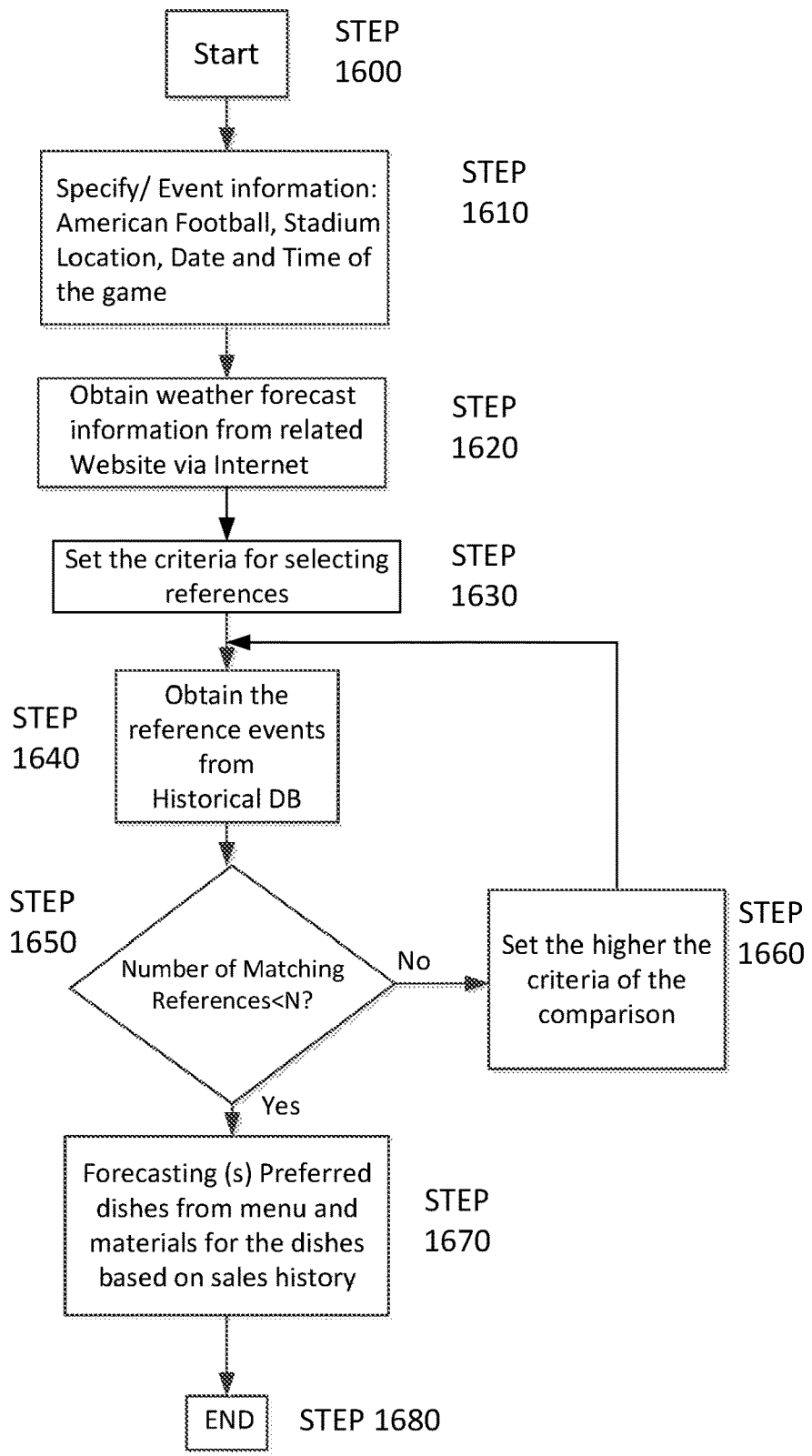
FIG. 16 illustrates a flow chart of the process for automatically developing a forecast of prospective dishes for customers who may visit the scheduled event being held at the vicinity of the restaurant and materials for the prospective dishes.

FIG. 16 illustrates a flow chart of the process for automatically making a forecast of preferred dishes for customers who may visit the scheduled event being held at the vicinity of the restaurant and materials for the preferred dishes. In an embodiment of the invention, it is assumed that American Football game is scheduled at a stadium in the vicinity of the restaurant on next Friday. As described using FIG. 10, the digital information gathering and analyzing apparatus 1000 has historical database including the historical transaction data from POS, environmental data including weather information and event information in a past obtained from related websites via internet, environmental data, which have been correlated to each other. In this example, American Football game is specified, but not limited to it. It may be any event, a music concert, a baseball game or a big conference, for example.

Task automation algorithms (TAA) start running on the server 1122 (STEP 1600) as illustrated in FIG. 16. When making a forecast of preferred dishes to be sold on the day when the American Football game is held in the vicinity of the restaurant, the event needs to be specified. Then, TAA is arranged to automatically obtain event information prior to the event by a predetermined term, for example 7 days before the event, not limited to 7 days but can be any days. In this case, the event information may include any types of event, for example, baseball game, football game, music concert, etc., time information including a day of the week, a week of the month and a month of the year when the event is scheduled. TAA provides the notice pertaining to the event to the people of the restaurant. It is also possible to input the event information manually in order to make a forecast of the preferred dishes which will be expected to be sold to the customers visiting the event in the same day.

Then, TAA obtains weather forecast information on the day, when event is scheduled, from weather forecast website, which will greatly give inference to the forecast of prospective dishes (STEP 1620). Then, TAA obtains reference events which are at least the same type of games as many references as possible. To obtain the same type of events in a past, at the first step, the criteria to select the same type of event in a past should be set at a low-level to search the same type of events (references) in a past as many as possible. Low-level criteria for searching the same type of references is set, for example, a type of event, such as American Football game or baseball game, etc. (STEP 1630). Then TAA searches the historical database to obtain references. When the number of obtained references is large enough, TAA sets the criteria at a higher-level by putting a time information, for example "a day of the week when the event is held", "a week of the month when the event is held" or "a month of the year when the event is held", for example to set a higher-criterial to obtain a higher-accuracy matching (STEP 1660).

Then, TAA checks whether the number of obtained references from the historical database is less than a predetermined number "N". If the number of obtained references from the historical database is more than the predetermined number "N" (STEP 1650), TAA is arranged to set the criteria at a higher-level by adding an item such as "a day of the week", "a week of the month" or "a month of the year" to narrow down the number of obtained references from the historical database to obtain high-accuracy as described above to obtain high-accuracy matching references.

According to the exemplary embodiment described above, it becomes possible to make a forecast of preferred dishes and their materials from the historical POS database. Comparing with the system including cameras for capturing a table number to correlate the customer and his/or transaction data as illustrated in FIG. 1, it can reduce the total data to be processed at the same time by the server, which can reduce a server management expense and processor cost. It becomes possible to grasping an expected number of customers to visit the restaurant and prospective dishes to be sold to the customers in a predetermined time window of the day when the event is scheduled.

In addition, obtained prospective dishes or preferred dishes from the menu can be automatically displayed on digital signages in the restaurant and publicized in a timing when prospective customers seem to appear in the restaurant which can be effective advertisement for management people of the restaurant. It is also useful for the employees of the restaurant to display in the backroom of the restaurant to let them know the prospective customers are coming and prospective dishes are such and such, for example.

Further, an exemplary embodiment of the invention is also useful to simulate the business possibility when a new restaurant is planned to be open in a new location. For example, when a new restaurant is planed in Tex., for example, according to Census Bureau information, average income and race distribution resemble to those of Ohio. A business simulation is possible without starting learning from zero by applying the TAA of the exemplary embodiment that had been processed in Ohio in conformity to the opening of the new restaurant in Tex.

In restaurant industry, job hopping which may lose know-how belonging to each restaurant becomes problems. It becomes possible accumulate know-how of each restaurant by using this system and apparatus.

The forgoing discussion discloses and describes merely exemplary embodiments of the present invention. One skilled in the art will readily recognize from such discussion, and from the accompanying drawings and claims, that various changes, modifications and variations can be made therein without departing from sprit and scope of the invention as defined in the following claims. In these embodiments, an embodiment associated with restaurant has been mainly described. However, an embodiment of the present invention can also be utilized in supermarkets, retailed stores, department stores, hotels, amusement parks, shopping malls and food coats can also be applicable.

What is claimed is:

1. An apparatus for forecasting preferred selections from a menu of a restaurant, the apparatus comprising:
   a) a face recognition system including at least two cameras, wherein a first camera of the two cameras is arranged to capture facial images of customers visiting the restaurant and a second camera of the two cameras is arranged to capture the facial images of the customers leaving the restaurant, wherein the face recognition system is capable of creating demographic profiles of the customers based on the captured facial images of customers, wherein the demographic profiles include estimated age, gender and ethnicity of the customers;
   b) a point of sales system (POS) including a portable terminal linked thereto for inputting orders from the customers, and for displaying transaction data including the preferred selections from the menu, wherein inputted orders are transmitted to the POS from the portable terminal;
   c) a server for running algorithms comprising steps of:
      receiving the demographic profiles of the customers from the face recognition system;
      obtaining environmental information including weather information and event information from relevant websites via internet;
      obtaining the transaction data of the customers from the POS;
      correlating uncorrelated data including the inputted orders including types of dishes from the customers within a predetermined time period, demographic profiles of the customers staying at the restaurant within the predetermined time period and the environmental information including weather information and event information with each other to generated correlated data thereof to accumulate the correlated data into database in the server;
      selecting the preferred selections from the database based on a criterial to narrow down a number of the preferred selections; and
      transferring the selected preferred selections to the portable terminal via the POS.

2. The apparatus for forecasting preferred selections from a menu of claim 1, the apparatus further comprising:
   a sensor system which is capable of measuring temperature inside the restaurant or capturing sound signals inside the restaurant;
   wherein the algorithms further comprise steps of;
   analyzing the sound signals;
   setting the criterial at a higher level to narrow down a number of the preferred selections from the database by adding a profile from demographic profiles of the customers or any information of the environmental information, or any combination thereof when the number of preferred selections from the database is more than a predetermined number.

3. The apparatus for forecasting preferred selections from a menu of claim 1,
   wherein the environmental information further includes traffic information in a vicinity of the restaurant.

4. The apparatus for forecasting preferred selections from a menu of claim 1,
   wherein the weather information includes temperature data.

5. The apparatus for forecasting preferred selections from a menu of claim 1,
   wherein the weather information includes humidity data.

6. An apparatus for forecasting preferred selections from a menu of a restaurant, the apparatus comprising:
   a) a face recognition system including at least two cameras, wherein a first camera of the two cameras is arranged to capture facial images of customers visiting the restaurant and a second camera of the two cameras is arranged to capture the facial image of the customers leaving the restaurant, wherein the face recognition system is capable of creating demographic profiles of the customers based on the captured facial images of customers, wherein the demographic profiles include estimated age, gender and ethnicity of the customers;
   b) a sensor system which is capable of measuring temperature inside the restaurant or capturing sound signals inside the restaurant;
   c) a point of sales system (POS) including a portable terminal linked thereto for inputting orders from the customers, and for displaying transaction data including the preferred selections from the menu, wherein inputted orders are transmitted to the POS from the portable terminal;
   d) a server for running algorithms comprising steps of:
      receiving the demographic profiles of the customers from the face recognition system;
      obtaining environmental information including weather information and event information from relevant websites via internet;
      obtaining the transaction data of the customers from the POS;
      analyzing the captured sound signals inside the restaurant;
      correlating uncorrelated data including the inputted orders including types of dishes from the customers within a predetermined time period, the analyzed sound signals, demographic profiles of the customers staying at the restaurant within the predetermined time period and the environmental information including weather information and event information with each other to generate correlated data thereof to accumulate the correlated data into database in the server;

selecting the preferred selections from the database based on a criterial to narrow down a number of the preferred selections; and transmitting the selected preferred selections onto SNS (Social Network Service).

7. The apparatus for forecasting preferred selections from a menu of claim 6, wherein the algorithms further comprise steps of;

setting the criterial at a higher level to obtain the preferred selections from the database by adding an item out of the estimated age, gender and ethnicity out of the demographic profiles of the customers and the weather information and the event information out of the environmental information when a number of preferred selections from the database is more than the predetermined number to narrow down the number of the preferred selections from the database.

8. The apparatus for forecasting preferred selections from a menu of claim 6, wherein the environmental information further includes traffic information in a vicinity of the restaurant.

9. The apparatus for forecasting preferred selections from a menu of claim 6, wherein the weather information includes temperature data.

10. The apparatus for forecasting preferred selections from a menu of claim 6, wherein the weather information includes humidity data.

11. An apparatus for forecasting preferred selections from a menu of a restaurant, the apparatus comprising:

a) a face recognition system including at least two cameras, wherein a first camera of the two cameras is arranged to capture facial images of customers visiting the restaurant and a second camera of the two cameras is arranged to capture the facial image of the customers leaving the restaurant, wherein the face recognition system is capable of creating demographic profiles of the customers based on the captured facial images of customers, wherein the demographic profiles include estimated age, gender and ethnicity of the customers;

b) a sensor system which is capable of measuring temperature inside the restaurant and capturing sound signals inside the restaurant;

c) a point of sales system (POS) including a portable terminal linked thereto for inputting orders from the customers, and for displaying transaction data including the preferred selections from the menu, wherein inputted orders are transmitted to the POS from the portable terminal;

d) a server for running algorithms comprising steps of:

receiving the demographic profiles of the customers from the face recognition system;

obtaining environmental information including weather information and event information from relevant websites via internet;

obtaining the transaction data of the customers from the POS;

obtaining satisfaction level of the customers by analyzing the sound signals;

analyzing the captured sound signals inside the restaurant;

correlating uncorrelated data including the inputted orders including types of dishes from the customers within a predetermined time period, the analyzed sound signals, demographic profiles of the customers staying at the restaurant within the predetermined time period and the environmental information including weather information and event information with each other to generate correlated data to accumulate the correlated data into database in the server;

selecting the preferred selections from the database based on a criterial to narrow down a number of the preferred selections; and displaying the selected preferred selections onto a digital signage installed in the restaurant or outside the restaurant.

12. The apparatus for forecasting preferred selections from a menu of claim 11, wherein the algorithms further comprise steps of;

setting the criterial at a higher level to obtain the preferred selections from the database by adding an item out of the estimated age, gender and ethnicity out of the demographic profiles of the customers and the weather information and the event information out of the environmental information when a number of preferred selections from the database is more than the predetermined number to narrow down the number of the preferred selections from the database.

13. The apparatus for forecasting preferred selections from a menu of claim 11, wherein the environmental information further includes traffic information in the vicinity of the restaurant.

14. The apparatus for forecasting preferred selections from a menu of claim 11, wherein the weather information includes temperature data.

15. The apparatus for forecasting preferred selections from a menu of claim 11, wherein the weather information includes humidity data.

16. The apparatus for forecasting preferred selections from a menu of claim 2 wherein the sound signals include words spoken by the customers inside the restaurant.

17. The apparatus for forecasting preferred selections from a menu of claim 6, wherein the sound signals include words spoken by the customers inside the restaurant.

18. The apparatus for forecasting preferred selections from a menu of claim 11, wherein the sound signals include words spoken by the customers inside the restaurant.

* * * * *